US008019717B2

United States Patent
Seubert et al.

(10) Patent No.: US 8,019,717 B2
(45) Date of Patent: Sep. 13, 2011

(54) DEFINITION OF CONTEXT FOR SPECIFYING UNIQUENESS OF IDENTIFIERS AND CONTEXT-BASED IDENTIFIER MAPPING

(75) Inventors: Michael Seubert, Sinsheim (DE); Jochen A. Rasch, Sandhausen (DE)

(73) Assignee: SAP AG, Walldorf (DE)

( * ) Notice: Subject to any disclaimer, the term of this patent is extended or adjusted under 35 U.S.C. 154(b) by 422 days.

(21) Appl. No.: 11/750,970

(22) Filed: May 18, 2007

(65) Prior Publication Data
US 2008/0288533 A1 Nov. 20, 2008

(51) Int. Cl.
*G06F 17/00* (2006.01)

(52) U.S. Cl. .................. 707/601; 707/803

(58) Field of Classification Search ............... 707/1–10, 707/103 R, 601, 803, 999.001–999.01
See application file for complete search history.

(56) References Cited

U.S. PATENT DOCUMENTS

| | | | |
|---|---|---|---|
| 7,774,388 B1 * | 8/2010 | Runchey | 707/811 |
| 2006/0080338 A1 | 4/2006 | Seubert et al. | |
| 2006/0085336 A1 | 4/2006 | Seubert et al. | |
| 2006/0085450 A1 | 4/2006 | Seubert et al. | |
| 2007/0150387 A1 | 6/2007 | Seubert et al. | |
| 2007/0192352 A1 * | 8/2007 | Levy | 707/102 |
| 2008/0120129 A1 | 5/2008 | Seubert et al. | |
| 2008/0126410 A1 | 5/2008 | Brunswig et al. | |

OTHER PUBLICATIONS

*Core Components Technical Specification—Part 8 of the ebXML Framework*; UN/CEFACT, United Nations Centre For Trade Facilitation And Electronic Business, Nov. 15, 2003, Version 2.01 (113 pages).

* cited by examiner

*Primary Examiner* — Mohammad Ali
*Assistant Examiner* — John P Hocker
(74) *Attorney, Agent, or Firm* — Fish & Richardson P.C.

(57) ABSTRACT

Systems, methods, and apparatus, including computer program products, providing unique identifiers for data-bearing digital objects. Scheme-based definition of uniqueness contexts and scheme-based mappings between identifiers are described. A method of one aspect includes generating a first object identifier for a first object of a first object type on a first system, the first object identifier having an identification context. The identification context includes a first system identifier or one or more second object identifiers of one or more respective second objects. The method further includes providing the first object identifier with the identification context to identify the first object uniquely. A method of another aspect includes defining an equivalence mapping between first identifiers with respective first identification context values and second identifiers with respective second identification context values; and using the equivalence mapping to map an identifier for one object to an identifier for another semantically equivalent object.

10 Claims, 6 Drawing Sheets

Defining Scheme Code List — 350

| Scheme Code | Scheme Name | Object | Length | Concatenated ID |
|---|---|---|---|---|
| 1 | Wilma | Wilma | 10 | No |
| 2 | Hugo Concatentation | Hugo | 25 | Yes |
| 3 | Expense Report | ExpenseReport | 40 | No |
| 4 | Purchase Order | PurchaseOrder | 35 | No |

Scheme Element List — 360

| Scheme Code | Object Component Type Code | Element | Position | Context Element |
|---|---|---|---|---|
| 1 | Wilma | D-ID | 1 | Yes |
| 1 | Wilma | E-ID | 2 | Yes |
| 1 | Wilma | F-ID | 3 | Yes |
| 1 | Wilma | ID | 4 | No |
| 2 | Hugo | A-ID | 1 | Yes |
| 2 | Hugo | B-ID | 2 | Yes |
| 2 | Hugo | C-ID | 3 | Yes |
| 2 | Hugo | ID | 4 | No |
| 3 | Expense Report | Employee-ID | 1 | Yes |
| 3 | Expense Report | ID | 2 | No |
| 4 | Purchase Order | ID | 1 | No |

DEFINITION OF CONTEXT FOR SPECIFYING UNIQUENESS OF IDENTIFIERS AND CONTEXT-BASED IDENTIFIER MAPPING

BACKGROUND

This specification relates to automatic digital data processing, and more particularly to the uniqueness of identifiers, including, e.g., identifiers for the identification of data-bearing digital objects.

Objects are a central level of abstraction for software applications implemented on an object-oriented paradigm. Objects may be of differing granularity, i.e., with or without components.

In this specification, the term "object identifier" refers to a data or metadata construct that identifies an object instance. An object instance is a particular data-bearing instance of an object type. A particular purchase order object, for example, can be an instance of a purchase order object type. In this specification, the terms "object" and "object instance" are used broadly to refer to any data-bearing, addressable resource; the meaning is not limited to the object-oriented programming senses of the terms. In addition, the meaning is not limited to objects that are generated or used by the conventional kinds of software applications; any kind of system component can generate an object that can have an object identifier.

In business and other applications, it is important to be able to identify objects unambiguously so that, for example, two different businesses' systems can understand and recognize each others' identifiers for their respective objects. It is also important that the identifiers be unambiguous, i.e., unique.

An identifier ("ID") is a unique identification of an instance of an object. The uniqueness of an identifier is always given with respect to an identification context.

The identification context always refers to an ID as a whole. An ID value is indivisible (i.e., the ID consists of only one field); that is, parts of an ID value do not identify the object.

In rare cases it may be that time is part of the context of an ID. In such a case, time information has to be used to realize the uniqueness and stability of an ID value. To accomplish this, the context definition of such an ID can include an element that represents time.

In the UN/CEFACT (United Nations Center for Trade Facilitation and Electronic Business) Core Component Technical Specification (CCTS), the identification context of an identifier is defined by what are called supplementary components of the identifier. The supplementary components may also be referred to as the attributes of an object ID. The pivotal supplementary component is the "identification scheme". Identifier values are unique with respect to such a scheme.

Supplementary components are always defined at design time for the object's object type. The values of these attributes are filled at configuration time or runtime.

The CCTS defines an identification context that is structured in layers. Each layer is unique only with respect to the next higher layer.

The innermost (lowest) layer is defined by an identification scheme with its schemeID. The scheme represents the identification context (with respect to the outer layers) in which the ID of an object is unique.

For an identifier, one or more identification contexts may exist. Each identification context is represented by a scheme (and thus, a schemeID). The identification scheme is defined at configuration time and interpreted at runtime.

The identification scheme can be versioned, that is, an identification scheme is unique in the context of a version. This is the middle layer, where a schemeVersionID identifies the version of the identification scheme.

The next layer is provided by the agency that issues and administrates the identification scheme and its versions. It is advantageous if this agency can be identified by a code value from a global, i.e., internationally standardized, code list, e.g., the UN/EDIFACT DE (data element) 3055 code list. This is the outermost layer of the identification context.

Thus, in the innermost layer, a schemeID identifies an identification scheme. The scheme represents the identification context of an object ID. In the next layer, a schemeVersionID identifies the version of the identification scheme. And in the next layer, a schemeAgencyID identifies the agency that manages the identification scheme. By default, this is a value from the DE 3055 code list.

For the case of standardized IDs, the just-described scheme is sufficient. Often the scheme represents an "ID-value-issuing system". An example of this is the ISBN number used to identify books, issued by ISO (the International Organization for Standardization).

SUMMARY

This specification describes identification techniques that pertain not only to standards organizations that issue identification schemes. The concepts are also applicable for companies which define their own identification contexts. An identification context may have various aspects or "dimensions". The context of an ID may depend on issuing systems as well as software applications running in these systems. In general, different applications define different structural dependencies for the uniqueness of an ID.

Thus, in order to exploit a given identification context, the techniques specify which of the various context aspects or "dimensions" are described in which form.

This specification describes the identification context of typed objects using two aspects in machine-readable form: (1) a structural identification context, supporting type-based as well as value-based contexts, and (2) an issuing identification context.

In general, one aspect of the subject matter described in this specification can be embodied in methods for identifying data bearing digital objects, the methods including the actions of generating a first object identifier for a first object of a first object type on a first data processing system, which first object identifier has an identification context, and providing the first object identifier with the identification context to identify the first object uniquely. The first system is a logical or a physical system and has a first system identifier. The identification context includes the first system identifier or one or more second object identifiers of one or more respective second objects or both. Other embodiments of this aspect include corresponding systems, apparatus, and computer program products.

These and other embodiments can optionally include one or more of the following features. The identification context includes both the first system identifier and the one or more second object identifiers of one or more respective second objects. The identification context includes two aspects, namely, a structural identification context and an issuing identification context; a structural identification scheme specifies that the one or more second object identifiers belong to the structural identification context; and an issuing identification scheme specifies that the system identifier belongs to the issuing identification context. The identification context includes the first system identifier and no object identifiers of other objects. An issuing identification scheme specifies that the system identifier belongs to an issuing identification context aspect of the identification context. The identification context includes the one or more second object identifiers of one or more respective second objects and not the first system identifier. A structural identification scheme specifies that the one or more second object identifiers belong to a structural identification context aspect of the identification context. The first object is an aggregated object and the one or more second objects are aggregating objects of the first object; and the identification context includes the one or more second object identifiers. The identification context includes the first system identifier. A structural identification scheme specifies that the one or more second object identifiers belong to a structural identification context aspect of the identification context; and an issuing identification scheme specifies that the system identifier belongs to an issuing identification context aspect of the identification context. A concatenation of the one or more aggregating objects' identifiers is included as part of the first identifier. A structural identification scheme specifies that the one or more second object identifiers belong to a structural identification context aspect of the identification context and further specifies that and how the one or more second object identifiers are concatenated into the first identifier. A structural identification scheme specifies that the one or more second object identifiers belong to a structural identification context aspect of the identification context and further specifies that and how the one or more second object identifiers are concatenated into the first identifier; and an issuing identification scheme specifies that the system identifier belongs to an issuing identification context aspect of the identification context. The structural identification scheme is defined by a structure defining agency and the identification scheme is specified in an agency specific scheme list of scheme codes, which are codes that define schemes. The issuing identification scheme is specified by a value issuing agency.

In general, another aspect of the subject matter described in this specification can be embodied in methods performed for a plurality of first identifiers that are unique with respect to a first identification context in identifying one of a plurality of first objects on a first system, and a plurality of second identifiers that are unique with respect to a second identification context in identifying one of a plurality of second objects on a second system, where the first and the second system are each either a logical or a physical system. The methods include the actions of defining an equivalence mapping between each of the first identifiers with its respective first identification context values and one of the second identifiers with its respective second identification context values; receiving an input identifier that, with its first identification context values, identifies one of the first objects, which first object has a semantically equivalent second object on the second system; and using the equivalence mapping to map the input identifier with its first identification context values to an output identifier with its identification context values, wherein the output identifier with its identification context values identifies the semantically equivalent second object on the second system. Other embodiments of this aspect include corresponding systems, apparatus, and computer program products.

These and other embodiments can optionally include one or more of the following features. The output identifier is contained in a second message sent to the second system and the method further includes the action of obtaining the input identifier from a first message sent by the first system and using a first identification scheme to extract from the first message the first identification context values of the input identifier, the first identification scheme being a structural identification scheme; using the equivalence mapping and a second identification scheme to obtain the output identifier and the second identification context values that correspond to the input identifier with its first identification context values, the second identification scheme being a structural identification scheme; and inserting the output identifier and the second identification context values into the second message according to the second identification scheme. The first system and the second system are different systems; the output identifier is contained in a second message sent to the second system; and the method further includes the actions of obtaining the input identifier from a first message sent by the first system and using a first structural identification scheme and a first issuing identification scheme to extract from the first message the first identification context values of the input identifier; using the equivalence mapping and a second structural identification scheme and a second issuing identification scheme to obtain the output identifier, the second identification context values that correspond to the input identifier with its first identification context values; and inserting the output identifier into the second message according to the second identification scheme. The method further includes the actions of inserting the second identification context values into the second message according to the second identification scheme. The two systems can be the same or different. The first identification context includes an identifier of the first system; and the second identification context includes an identifier of the second system. The first identification context includes one or more object identifiers of one or more respective additional objects; and the second identification context includes one or more object identifiers of one or more respective additional objects. The first objects are aggregated objects and the one or more additional objects are respective aggregating objects of the first objects. A concatenation of the one or more aggregating objects' identifiers is included as part of the first identifier. The equivalence mapping is defined by a mapping table.

Particular embodiments of the subject matter described in this specification can be implemented to realize one or more of the following advantages. Clear and explicit semantic understanding of an identifier's uniqueness regarding both structural and issuing context can be realized. Independent businesses' systems can share object identifiers without risk of ambiguity. Identifiers can be mapped between independent systems in an automatic way.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One aspect of the identification context of an ID is the issuing context, that is, the entities (applications, systems, and so on) that issue ID values. Knowing the issuing context is sufficient as long as all entities that issue ID values in the issuing context share a common understanding of the ID. The issuing context will be described more detailed below.

However, applications exist that do not have such a common understanding. If the ID values leave the application context in this case, it may not be clear which understanding of the ID the defining application had. For example, applications may make the uniqueness of an ID value depend on other object values. Applications may differ in the length they use for the ID.

Several applications (possibly from different software vendors) with such different understandings for a single ID may run on one system or, more generally, within one issuing context.

Even when an ID value is unique within the issuing context, further information identifying an object may be needed when the ID value leaves the issuing context, for example, when the ID value is contained in a message exchanged between software components.

In either case, a second dimension can be used to establish the uniqueness of an ID. This dimension will be referred to as the structural context and will be described below in detail. The structural context of an instance, and thus of an ID whose value identifies the instance, states with respect to which structural dependencies the instance is created. The structural context, too, can be specified by supplementary components and is defined at design time.

Combining supplementary components for a structural context with those for an issuing context results in an ID value that, together with the values of its supplementary components, is globally unique. Together they have a URL-like quality, in the sense that they can be used to access an object instance.

To achieve global uniqueness in the general case, both aspects (issuing and structural context) have to be used.

Structural Identification Context

Object types may be of different granularity, i.e., with or without components. Objects define the semantics of a software application and thus form the basis for understanding data identifiers from the application point of view. This understanding is reflected in the structural context of an identifier.

The term "structural" refers to dependencies that define the uniqueness of an identifier. Such as dependencies can include, for example, specifying (a) that a purchase order item ID is unique with respect to a purchase order ID; (b) that an ID of object A is unique with respect to elements X, Y, Z of object A; or (c) that an ID of object A is unique with respect to an ID of object B. The term "structural" can also refer to a length and/or structural pattern for an ID.

Two kinds of structural identification contexts are addressed, as explained below.

Type-Based Identification Contexts

Fundamentally, every object type defines its own structural identification context. This context is represented by a structural identification scheme.

For this, two additional supplementary components are used: (1) the definingSchemeID, which identifies the structural identification scheme; and (2) the definingSchemeAgencyID, which identifies the agency that manages the structural identification scheme.

Value-Based Identification Contexts

Figure 1:
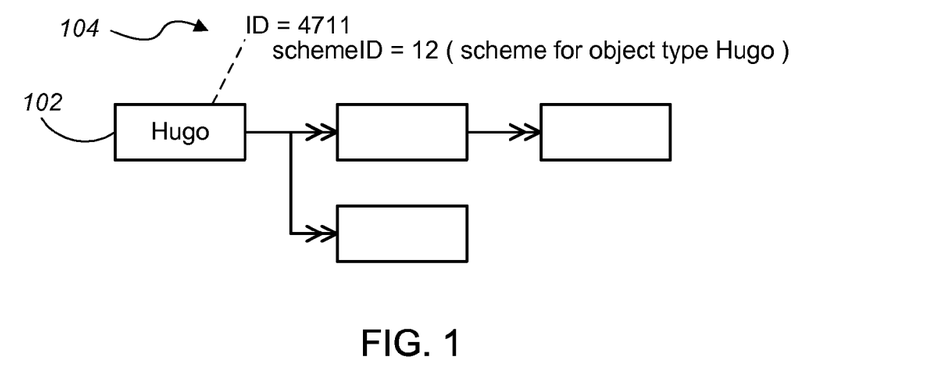
FIG. 1 illustrates an object instance having an identifier in a context having a schemeID.

FIG. 1 illustrates an object instance of type Hugo (102) that has an ID of '4177' in a context having a schemeID of '12' (104) that is given by the object type Hugo itself. That is, the identifiers of all objects of type Hugo will have a context having a schemeID of '12'.

The uniqueness of instances of an object type can be defined with respect to instances of other object types. The former objects will be referred to as aggregated objects; the latter, as aggregating objects. Even in the case of an aggregated object, the object type still can define the context of its object instances.

On the other hand, the context for the aggregated object may be defined by instances of the other, aggregating object types, as will be described. In this case the structural identification context of an instance, and thus the uniqueness of its identifier, depends on one or more instances of other object types.

The aggregating objects—strictly speaking, the values of these objects—provide the context for the aggregated object. This will be referred to as a value-based identification context.

A value-based identification context is defined by one or more elements from the aggregating object or objects. These elements may be called "context elements".

Figure 2:
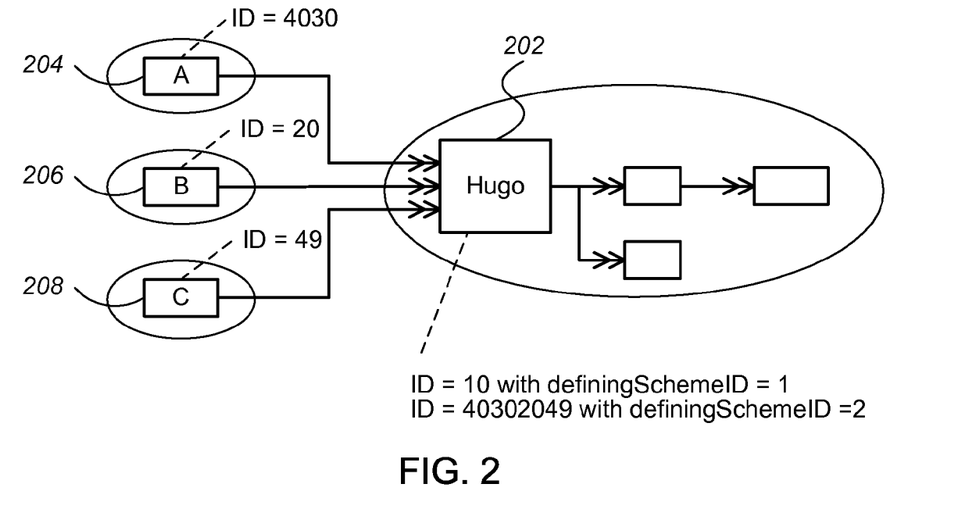
FIG. 2 illustrates an aggregated object with aggregating objects.

This is illustrated in FIG. 2, which shows an aggregated object of type Hugo (202). It aggregates objects A, B, and C (204, 206, 208). These have IDs of 4030, 20, and 49, respectively, with respect to some context. The context of objects A, B, and C is not relevant for the present example.

For a value-based structural identification context, two alternatives will be described:

In case (a) the object ID is unique only with respect to the values of the context elements; and In case (b) the object ID is concatenated from the context element values, and in this way becomes unique with respect to the object type.

For case (a), the context elements have to be taken into account for the object ID. Different object instances can have the same object ID value, but each with different aggregating objects. In this case, the values of the context elements are included in the object.

Case (b) yields a "concatenated ID" of a length that is implied by the length of the concatenated elements. This concatenated ID has the quality of a constructed universally unique identifier (UUID). By concatenating the context, the ID becomes globally unique. In this case, the object ID is unique with respect to the object type itself because the context elements are used to construct the object ID.

The different cases are reflected by different identification schemes of the object.

In the particular example of FIG. 2, given above, in case (a) the object has an ID=10 in a scheme that has a definingSchemeID=1, for example. In this scheme, the context of the ID of the instance of Hugo includes the IDs of the aggregating object instances, which provide the context to make the ID=10 unique. These context values can be denoted A-ID=4030, B-ID=20, and C-ID=49.

For case (b) there will be a different scheme, with definingSchemeID=2, for example, that provides for a concatenated ID. With the values given above, the concatenated ID for the instance is 40302049, assuming that the scheme provides for concatenation in the order A, B, and C. This concatenated object ID is unique with respect to the object type Hugo itself because the context elements are used to construct the concatenated object ID.

Note that cases (a) and (b) are reflected by different identification schemes of the object. In general, an object can have many identification schemes.

In cases (a) and (b), the context elements are interpreted differently according to the quality of the ID. In case (a), the context elements specify the context in which the object ID is unique. An ID value is unique only with respect to the values of the context elements. In case (b), the context elements state from which elements the object ID is constructed. An ID value is unique for the object type, since it is constructed from the values of the context elements.

Context of an Object Component Identifier

Like the object instance, components of an object instance also have IDs. Object components always belong to exactly one object. Thus, for an ID of a component, the context is always the object. Consider an example purchase order object that has items as object components. The ID of a purchase order item is unique only within the purchase order to which it belongs: a purchase order with ID 4051 may contain an item 10, and a second purchase order 7921 may also contain an item 10. The item ID is unique only in the context of the purchase order instance.

List Of Scheme Codes

A structural identification scheme specified by an agency is of code-like quality: It is a stable representation of the structural uniqueness of an ID. The set of defining scheme IDs managed by a single agency can be considered to be a code list issued by the agency, with the code value being used to fill the supplementary component definingSchemeID.

This will be described with reference to the example objects and lists illustrated in FIGS. 3A and 3B.

Figure 3A:
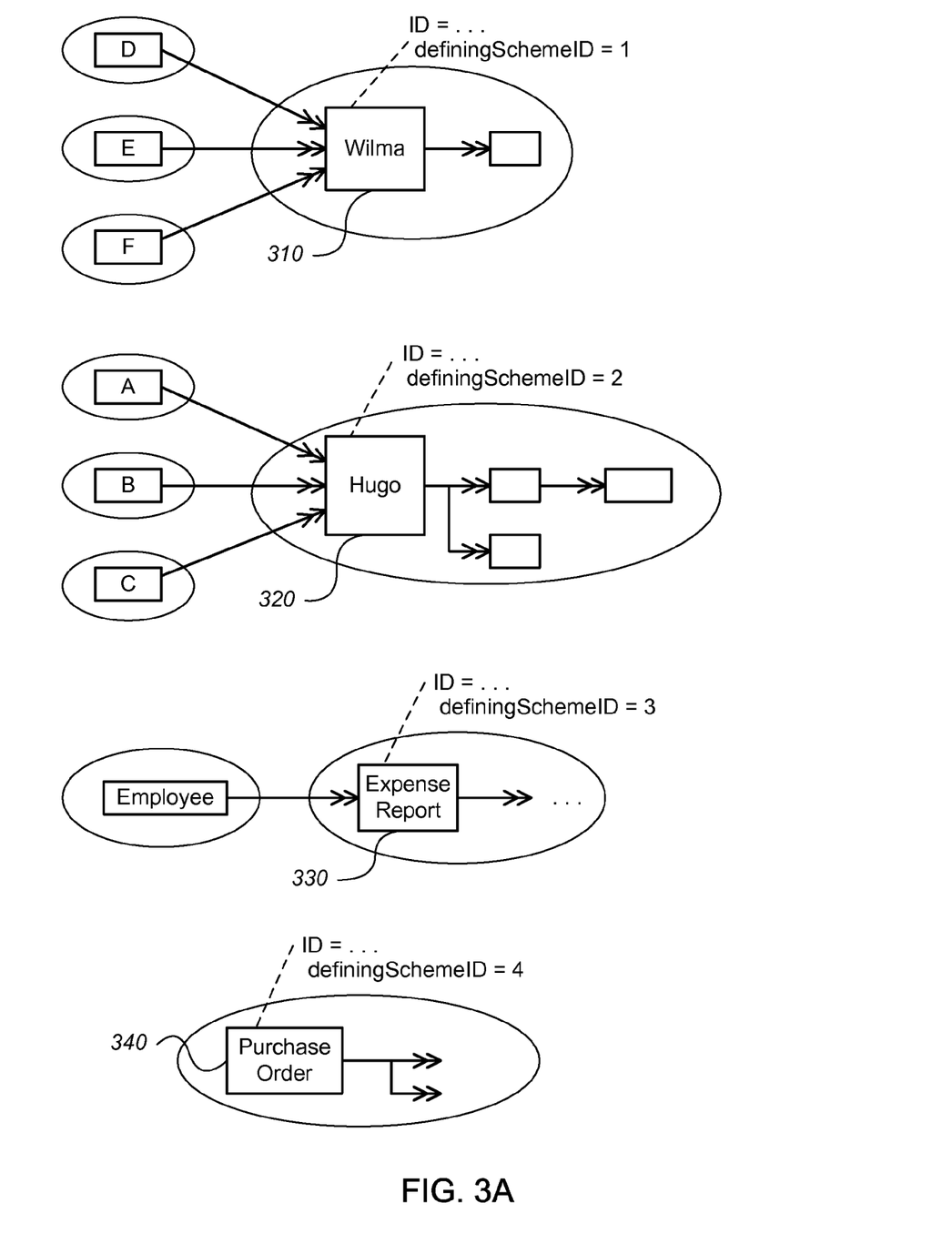
FIG. 3A illustrates example instances of different object types with different contexts.

FIG. 3A shows four object instances, an instance of type Wilma (310), an instance of type Hugo (320), an instance of type Expense Report (330), and an instance of type Purchase Order (340). Their respective IDs have schemeIDs of 1, 2, 3, and 4, respectively. As shown in FIG. 3A, both Wilma and Hugo are aggregated objects.

For each structural identification context defined by an agency for identification, a scheme is specified in an agency list that defines scheme codes. This is true whether or not the scheme is value based.

Figure 3B:
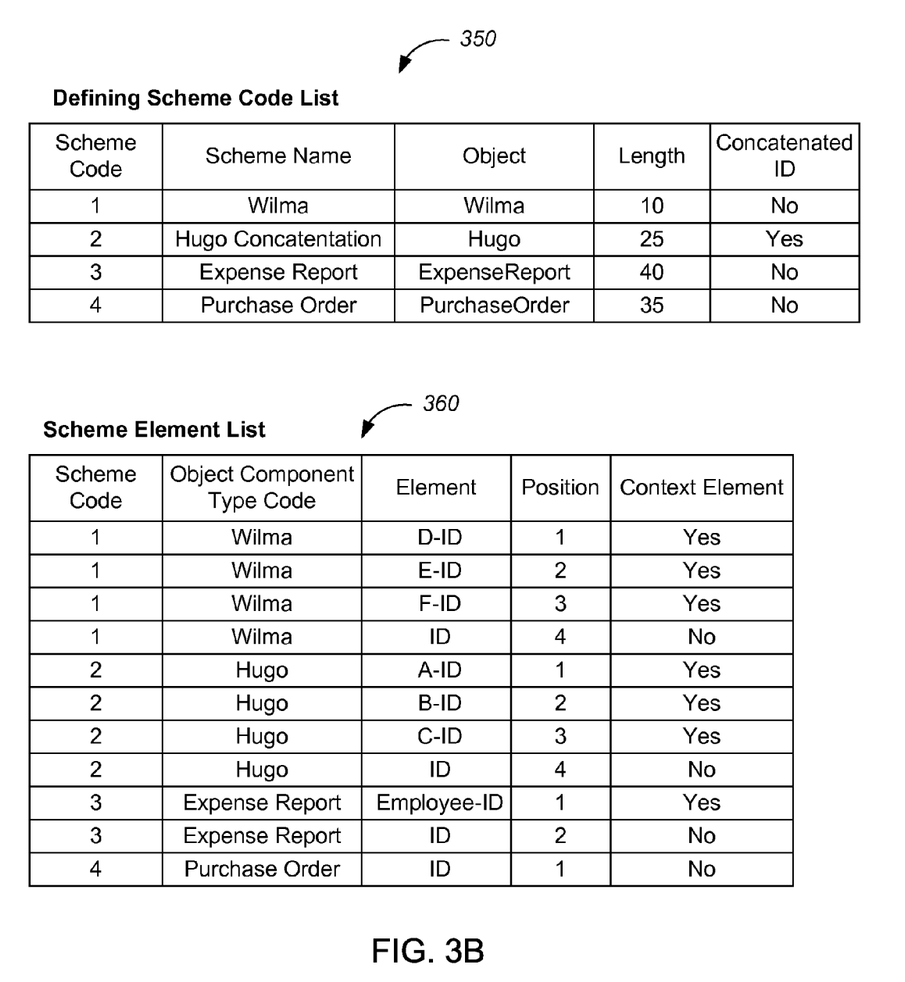
FIG. 3B illustrates a scheme code list and a scheme element list in reference to the instances of FIG. 3A.

FIG. 3B illustrates a scheme code list 350 for the objects illustrated in FIG. 3A. The scheme code list provides meta information about a specified defining scheme. This can include its code, its scheme name and the object (or object component) for whose ID the scheme is defined, its context, and the length of the ID element.

As also shown in FIG. 3B, for each scheme, the respective scheme elements can be specified in a scheme element list 360. The scheme code list 350 and the scheme element list 360 are linked by the scheme code. A scheme element is either (a) the ID element for which the scheme is defined, or (b) a context element from a specific object component, if the scheme represents a value-based identification context.

For each element, the object component is specified to which the element belongs. For this purpose, codes can be used to represent the object components in a uniform way. In the scheme element list 360 illustrated in FIG. 3B, this is done by object component type codes.

Context elements are specified, if the scheme represents a value-based identification context. In this case the position (ordering) of context elements and the ID element also is specified. This information is used for concatenation ID schemes, to construct the ID value from the context element values, and for mapping purposes. It specifies the sequence in which context elements and ID elements are to be combined. In the illustrated schemes, the ID element takes the last position.

The scheme element information can, for example, be used to access the context elements of an ID at runtime. It can also be used in the mapping of IDs.

For mapping, the scheme information is used in the following way: An ID value of an object carries in its supplementary component definingSchemeID the identifier of the structural identification scheme. The definition of this scheme is retrieved from the scheme code list. The context elements provided in the scheme definition state which elements of the object (or of an aggregating object) have to be considered.

Together with the values of these elements, the ID value becomes unique from the structural point of view.

This procedure applies as well for any ID of a component within an object.

Note that the existence of context elements does not necessarily imply that an ID value is concatenated from the context element values. Whether the ID value is concatenated or not is solely specified by the defining scheme, as illustrated by scheme code list 350 in FIG. 3B.

Identification of Agencies that Define Structural Identification Schemes

As in the case of the identification scheme agency, a mechanism is required to uniquely identify the agency that provides a structural identification scheme.

Values from the standardized code list DE 3055 can be used for both the schemeAgencyID and definingSchemeAgencyID to identify the respective agency. However, this code list contains mainly standards organizations, standards-like organizations, and government agencies. The majority of companies that build software or use software to run their business is not covered by it. Therefore, another mechanism to identify agencies is necessary. For this, the World Wide Web URL of the company can be used. It is globally unique and, due to the distinctive structure of a URL string, clearly distinguishable from any DE 3055 code value.

Thus, an agency is identified either by its code from list DE 3055 or—if it is not registered in DE 3055—by its URL. The respective supplementary component is filled with one of these values.

Issuing Identification Context

The structural identification context, represented by a defining scheme, specifies the uniqueness of an ID strictly from the structural point of view: Objects define the application domain (e.g., business) understanding, and the structural identification context specifies on which objects (or components of objects) the uniqueness of an ID depends.

However, software that assigns object IDs, e.g., a business application, runs in a physical system. All systems on which a business application is deployed use the defining schemes (structural identification context) defined for an ID. However, the values created for an object ID generally depend on and are specific to the system or issuer. It is undesirable and in some cases even infeasible to require that applications deployed on different systems cooperate in the assignment of object IDs. The issuing identification context allows unique IDs to be created even in such circumstances.

An example of the problem is provided by a purchasing application that is deployed to two systems. The application manages purchase orders. For a purchase order object a scheme is defined stating that a purchase order ID is unique with reference to the object type purchase order. That is, the ID has no additional context elements. An example of this is the Purchase Order object instance (340) in FIG. 3A. Nevertheless, in both systems a purchase order with ID 4711 may exist, denoting different purchase order instances. Both systems use the same structural identification context (i.e., the same structural identification scheme), because, from the structural point of view, purchase orders are identified in the same way in both cases. But the creation of the ID value, and thus, the uniqueness of the ID value, also depends on the system.

Thus, in addition to the structural identification context, an issuing identification context must be taken into account to assure the uniqueness of an identifier. The issuing identification context is defined by a logical (or physical) system of the scheme agency, which system can be defined, for example, along legal, business, administrative, or geographical lines.

The issuing identification context is bound to the previously-mentioned CCTS supplementary components schemeID, schemeVersionID and schemeAgencyID.

The issuing context is always required to ensure uniqueness, except for the (very unlikely) case where ID values are unique across all value-issuing entities.

In some cases only the issuing context needs to be specified for an ID, for example, if interpreting the structural uniqueness of the ID is not required, if no context elements exist, if only one application runs in a system, or if the ID is only considered in the current structural context. This applies, for example, for standardized IDs, where the structural context is given by a standards organization and thus is globally unique.

Note that in general a structural identification context does not depend on an issuing identification context or system. The structural identification context is defined based on the application semantics, which may be and commonly is represented by an object model. In every system on which an application is deployed, the same semantics applies.

Meta Model of Identification

To summarize, an ID value is unique with respect to an identification context that takes into account the structural aspects (i.e., the structural identification context) and the issuing aspects (i.e., the issuing identification context).

These two aspects are represented by different attributes (the supplementary components) of an ID. With these attributes, the identification context of an ID is specified explicitly.

The structural context can be specified with respect to an object model, as has been described, but this is just one option. Any other means to specify application semantics, application entities, and dependencies between them can be used as a basis for defining structural contexts.

A software vendor is one agency that can define structures, and thus specify scheme codes. The scheme codes define the identification structure of the vendor's applications, namely, what identification schemes exist and what structural identification context is defined by them.

Agencies issue ID values. An agency that issues ID values may run several logical or physical systems that issue values. Each system defines an issuing identification context, represented by a scheme.

In general, the agency that specifies a structural identification scheme and the agency that issues ID values are not the same. Usually the former is a software vendor, whereas the latter is a company or organization that uses the software to run its business. If, however, a company uses software built by itself, then the company may define additional structural contexts and act as the agency for both aspects.

Scheme-Based Mapping of IDs in Different Contexts

The explicit definition of structural identification contexts by schemes provides a foundation for the generic mapping or transformation of ID values in messages.

Figure 4A:
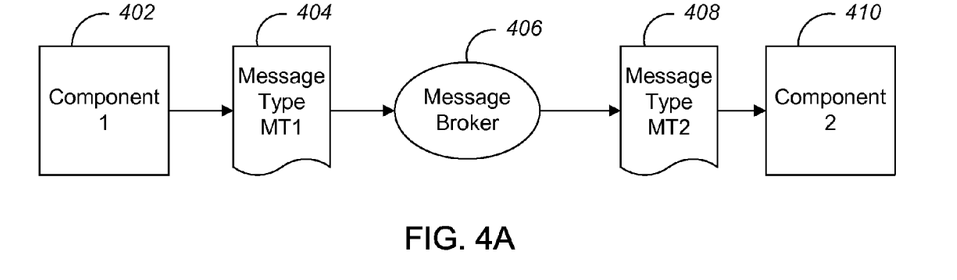
FIGS. 4A-4D illustrate a general case of mapping between messages of different message types and identification contexts.

This is illustrated in FIG. 4A, which illustrates a general case of message exchange between components. In some implementations, messages are exchanged between components through a message broker. Two message formats ("message types") are involved in this example: Message type MT1 (404) used for messages from component 1 (402) to the broker (406), and message type MT2 (408) used for messages from the broker to component 2 (410).

The following cases will be distinguished:

(a) MT1 and MT2 have the same structure (that is, a common message type is used for communication), and the ID values in the messages are understood by both components in the same way.

(b) MT1 and MT2 have the same structure, but how applications using the ID values would understand the ID values (that is, the structural identification context) is different.

(c) MT1 and MT2 have different structures, that is, different message types are used, and a structural mapping by the broker is required.

In cases (b) and (c), a mapping of ID values is necessary.

Figure 4B:
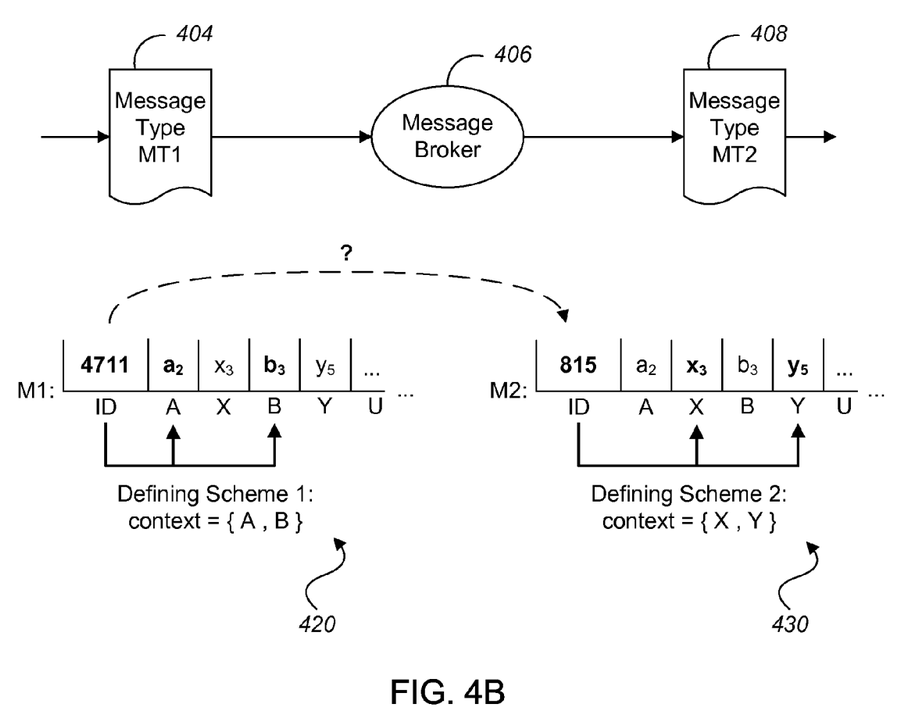

FIG. 4B illustrates an example mapping of ID values. In this example, the ID value 4711 in a message M1 (420) of message type MT1 (404), which is unique with reference to scheme 1, has to be mapped to the ID value 815 in a message M2 (430) of message type MT2 (408), which is unique with reference to scheme 2.

The question is how to find the right ID value for MT2, starting with the ID value 4711 from a message of message type MT1.

The value 4711 cannot be simply mapped to 815. For the mapping of ID values the context as defined by the scheme is essential, since only an ID value together with context values is unique. In the example of FIG. 4B, in MT1, the context values are the values of message elements A and B. In MT2, the context values are the values of message elements X and Y.

To perform the mapping, a generic approach is used. Based on the context definitions given by the structural identification schemes, a concatenation of context element values and ID value according to scheme 1 is mapped to a concatenation of values according to scheme 2.

Figure 4C:
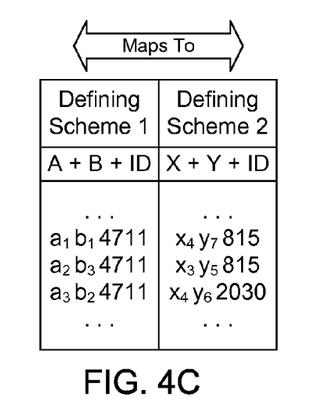

FIG. 4C illustrates a context mapping table of the mapping of ID values in context. In general, such a table is provided (or built up incrementally) by application experts. This table specifies, for example, that if the values (according to scheme 1) of A, B and the ID are $a_1$, $b_1$ and 4711 respectively, the values (according to scheme 2) of X, Y and the ID are $x_4$, $y_7$ and 815 respectively, and vice versa.

Figure 4D:
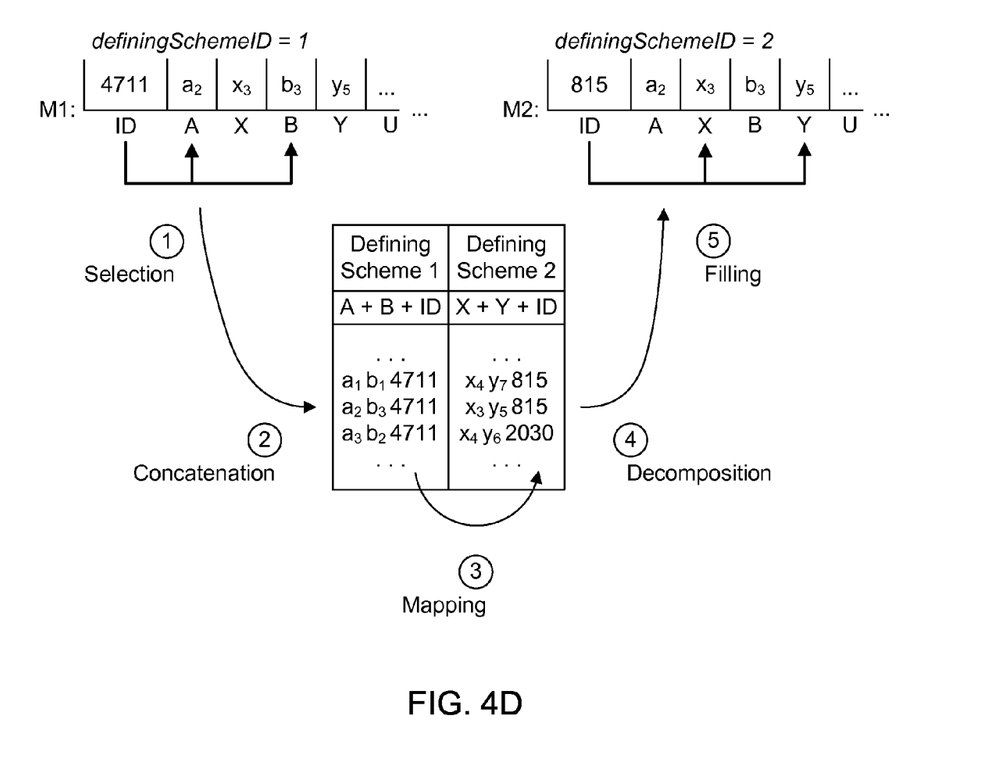

FIG. 4D illustrates a scheme-based mapping of ID values. In the example of FIG. 4D, in the ID mapping from message M1 to M2, the schemes are used in the following way to determine the ID value for M2:

(1) Selection of context values.
In M1, the values of context elements ($A=a_2$, $B=b_3$) for ID 4711 are selected according to the definition of scheme 1.

(2) Concatenation according to scheme.
Context element values and ID value are concatenated according to scheme 1 to generate a value that can be used to perform a lookup in the context mapping table.

(3) Mapping
For the concatenated value, the matching entry in the context mapping table is selected. It provides the concatenated value according to scheme 2.

(4) Decomposition according to scheme.

Using the definition of scheme 2, the concatenated value is decomposed into context element values ($X=x_3, Y=y_5$) and ID value 815. This is the inverse of the concatenation operation of step (2).

(5) Fill ID with mapped value.

In M2 the ID element is filled with value 815, which is unique with reference to scheme 2.

Using this approach to map between scheme-defined concatenations of context and ID values, ID mappings between arbitrary contexts can be performed in a generic and uniform way. This provides a foundation that can be used to build a mapping framework.

Note that M1 may already contain the context elements of scheme 2 (as in the example in FIG. 4B). However, this is not required, since these context values can also be added to M2 from the value mapping.

The described approach also applies to special cases, such as when different numbers of context elements exist in the two contexts, or when IDs without structural contexts (that is, no context elements, and thus no value-based identification context) exist, or when mapping a non-concatenated ID in MT1 to a concatenated ID in MT2 (or vice versa) is required.

In a similar way, the issuing context (scheme) can also be taken into account in the mapping, for example, in the form of a separate column used in the matching, or as a further value that is concatenated to form the lookup value and recovered in decomposition, as described above. In some cases, only the issuing context needs to be specified to map an ID. In other cases, only the structural context needs to be specified.

Moreover, the approach is independent of whether the mapping is performed by one of the involved components or by a separate message broker. In the most general case, a broker is used. However, independent of the chosen approach, it is necessary to use the scheme-defined context information to define a correct mapping.

Finally, while the use of a table structure is convenient, the context mapping need not be represented by a table. Any data structure that can represent the pairwise equivalence of tuples of context element values can be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A system comprising:
a computer having memory, the memory storing instructions that when executed by the computer perform operations comprising:
defining an aggregate object on a data processing system, wherein the aggregate object incorporating data from at least two aggregating objects, and each of the aggregating objects has a respective object identifier, and wherein the aggregate object includes a scheme name and scheme ID;
generating an object identifier for the aggregate object, the object identifier for the aggregate object being unique within a particular identification context, wherein the identification context includes a structural identification context that identifies particular dependencies of the aggregate object, the object identifier for the aggregate object being unique with respect to the particular dependencies and including a concatenation of at least one of the object identifiers of the at least two aggregating objects, and at least one of the particular dependencies is based on the incorporated aggregating object data, wherein the identification context further includes at least one of the object identifiers of the aggregating objects, wherein the generation of the object identifier for the aggregate object is based at least in part on a structural identification scheme specifying that aggregating objects belong to the structural identification context and further specifying how object identifiers of the aggregating objects are concatenated into the object identifier for the aggregate object; and
providing the object identifier of the aggregate object together with the corresponding identification context to identify the aggregate object uniquely on the data processing system.

2. The system of claim 1, wherein the system has a system identifier and the identification context includes both the system identifier and at least one of the object identifiers of the aggregating objects.

3. The system of claim 2, wherein:
the identification context also includes an issuing identification context; and
an issuing identification scheme specifies that the system identifier belongs to the issuing identification context.

4. A computer-implemented method comprising the following steps performed by at least one processor:
defining an aggregate object on a data processing system, wherein the aggregate object incorporating data from at least two aggregating objects, and each of the aggregating objects has a respective object identifier, and wherein the aggregate object includes a scheme name and scheme ID;
generating an object identifier for the aggregate object, the object identifier for the aggregate object being unique within a particular identification context, wherein the identification context includes a structural identification context that identifies particular dependencies of the aggregate object, the object identifier for the aggregate object being unique with respect to the particular dependencies and including a concatenation of at least one of the object identifiers of the at least two aggregating objects, and at least one of the particular dependencies is based on the incorporated aggregating object data, wherein the identification context further includes at least one of the object identifiers of the aggregating objects, wherein the generation of the object identifier for the aggregate object is based at least in part on a structural identification scheme specifying that aggregating objects belong to the structural identification context and further specifying how object identifiers of the aggregating objects are concatenated into the object identifier for the aggregate object; and
providing the object identifier of the aggregate object together with the corresponding identification context to identify the aggregate object on the data processing system.

5. The method of claim 4, wherein the system has a system identifier and the identification context includes both the system identifier and at least one of the object identifiers of the aggregating objects.

6. The method of claim 5, wherein:
the identification context also includes an issuing identification context; and
an issuing identification scheme specifies that the system identifier belongs to the issuing identification context.

7. The method of claim 4, wherein the structural identification scheme specifies that the object identifiers of the aggregating objects belong to a structural identification context aspect of the identification context.

8. A computer program product, encoded on a non-transitory, computer-readable medium, operable to cause data processing apparatus to perform operations comprising:
  defining an aggregate object, wherein the aggregate object incorporates data from at least two aggregating objects, each of the aggregating objects having a respective object identifier, and wherein the aggregate object includes a scheme name and scheme ID;
  generating an object identifier for the aggregate object, the object identifier for the aggregate object being unique within a particular identification context, wherein the identification context includes a structural identification context that identifies particular dependencies of the aggregate object, the object identifier for the aggregate object being unique with respect to the particular dependencies and including a concatenation of at least one of the object identifiers of the at least two aggregating objects, and at least one of the particular dependencies based on the incorporated aggregating object data, wherein the identification context further includes at least one of the object identifiers of the aggregating objects, wherein the generation of the object identifier for the aggregate object is based at least in part on a structural identification scheme specifying that aggregating objects belong to the structural identification context and further specifying how object identifiers of the aggregating objects are concatenated into the object identifier for the aggregate object; and
  providing the object identifier of the aggregate object together with the corresponding identification context to identify the aggregate object uniquely.

9. The product of claim 8, wherein:
  the identification context also includes an issuing identification context; and
  an issuing identification scheme specifies that the system identifier belongs to the issuing identification context.

10. The product of claim 8, wherein the structural identification scheme specifies that the object identifiers of the aggregating objects belong to a structural identification context aspect of the identification context.

\* \* \* \* \*